(12) United States Patent
Shou et al.

(10) Patent No.: US 7,920,763 B1
(45) Date of Patent: Apr. 5, 2011

(54) MODE FIELD EXPANDED FIBER COLLIMATOR

(75) Inventors: Yuanxin Shou, Wellesley, MA (US); Jing Zhao, Winchester, MA (US)

(73) Assignee: Agiltron, Inc., Woburn, MA (US)

( * ) Notice: Subject to any disclaimer, the term of this patent is extended or adjusted under 35 U.S.C. 154(b) by 0 days.

(21) Appl. No.: 11/983,912

(22) Filed: Nov. 13, 2007

Related U.S. Application Data

(60) Provisional application No. 60/900,379, filed on Feb. 9, 2007.

(51) Int. Cl.
*G02B 6/32* (2006.01)

(52) U.S. Cl. ................... 385/33; 385/31; 385/34

(58) Field of Classification Search ............. 385/31–34
See application file for complete search history.

(56) References Cited

U.S. PATENT DOCUMENTS

| | | | | |
|---|---|---|---|---|
| 5,457,759 | A * | 10/1995 | Kalonji et al. ................ | 385/31 |
| 5,757,993 | A | 5/1998 | Abe | |
| 6,014,483 | A * | 1/2000 | Thual et al. ................ | 385/33 |
| 6,542,665 | B2 | 4/2003 | Reed et al. | |
| 6,643,428 | B2 | 11/2003 | Chang | |
| 6,718,281 | B2 * | 4/2004 | Duncan et al. ............. | 702/159 |
| 6,751,369 | B1 * | 6/2004 | Lewis ........................ | 385/18 |
| 6,847,770 | B2 | 1/2005 | Kittaka et al. | |
| 6,934,087 | B1 | 8/2005 | Gutierrez et al. | |
| 7,068,883 | B2 | 6/2006 | Ludington et al. | |
| 7,121,735 | B2 * | 10/2006 | Jitsuno et al. ............... | 385/79 |
| 7,155,096 | B2 * | 12/2006 | Chanclou et al. ........... | 385/123 |
| 7,308,171 | B2 * | 12/2007 | Booth et al. ................ | 385/34 |
| 7,336,868 | B2 * | 2/2008 | Fouche' .................... | 385/24 |
| 2003/0156786 | A1 * | 8/2003 | Pan ........................... | 385/27 |
| 2004/0013437 | A1 * | 1/2004 | Wiltsey et al. .............. | 398/183 |
| 2004/0022503 | A1 * | 2/2004 | Okazaki et al. ............. | 385/96 |
| 2004/0071398 | A1 * | 4/2004 | Pierce et al. ............... | 385/28 |
| 2005/0201701 | A1 * | 9/2005 | Chanclou ................... | 385/124 |
| 2006/0243931 | A1 * | 11/2006 | Haran et al. ................ | 250/574 |

OTHER PUBLICATIONS

William L. Emkey et al.; Analysis and Evaluation of Graded-Index Fiber-Lenses; J. Lightwave Tech. vol. LT-5, No. 9, Sep. 1987; pp. 1156-1164.

* cited by examiner

*Primary Examiner* — Ellen Kim
(74) *Attorney, Agent, or Firm* — Burns & Levinson LLP; Orlando Lopez

(57) ABSTRACT

The present invention discloses an optical fiber collimator suitable for coupling optical radiation from an optical fiber to an optical device, the optical fiber collimator comprising: a graded-index multi-mode fiber segment for receiving optical radiation transmitted by the input optical fiber; an optional mode field device, and a collimating lens for receiving optical radiation transmitted by the graded-index multi-mode fiber segment, the collimating lens for coupling the optical radiation into the optical device.

5 Claims, 5 Drawing Sheets

MODE FIELD EXPANDED FIBER COLLIMATOR

CROSS-REFERENCE TO RELATED APPLICATION

The present Application claims the benefit of Provisional Patent Application No. 60/900,379 entitled "A method for fabricating low loss and low cost fiber optic devices with mode field expanded fiber collimator," filed 9 Feb. 2007 and incorporated by reference herein in its entirety.

BACKGROUND OF THE INVENTION

1. Field of Invention

The present invention relates to optical fiber collimators, and more particularly, to the coupling of optical radiation between optical fibers and optical devices.

2. Description of the Background Art

Micro-optic fiber devices are widely used in applications such as: optical communication systems, fiber optical source systems, and fiber sensor systems. Micro-optic fiber devices typically comprise optical management elements disposed between an input optical fiber and an output optical fiber. This configuration provides a means by which parameters such as light polarization status, signal power level, optical spectral, optical temporal, and optical beam direction can be modified. The optical fiber device typically functions to couple optical radiation from the input optical fiber for propagation through an optical management element, for example, and also functions to couple the optical radiation from the optical management element into the output optical fiber with maximum efficiency.

FIG. 1 shows a conventional small-core optical collimator 10 comprising an optical fiber 11 with a single-mode core 13, as may be used in an optical switching network (not shown). Optical signals in a light beam 19 may be output from the optical fiber 11 and coupled to a C-lens 15. In the example shown, the mode field of the optical fiber 11 may have a constant diameter of about 4 µm or less. The numerical aperture (NA) at an end face 17 of the optical fiber 11 may be about 0.2 or higher. A margin ray 21 passes near the C-lens 15 and converges at a focus point 23 on an optical axis 25. A paraxial ray 27 converges at a focus point 29 on the optical axis 25. Accordingly, the small-core fiber collimator 10 produces aberration as a consequence of the focus point 23 being spatially displaced from the focus point 29.

FIG. 2 shows the conventional small-core optical collimator 10 in optical communication with a second conventional small-core optical collimator 30 that includes a second C-lens 31 and a second optical fiber 33 having a second single-mode core 35. In the configuration shown, the paraxial ray 27 is focused into the second optical fiber 33, which results in a correspondingly low insertion loss. The margin ray 21, however, divergences to produce a larger beam spot at the end of the second optical fiber 33, which results in a correspondingly higher insertion loss.

An alternative configuration of fiber collimators, that includes a fiber pigtail and a collimator lens, may be used to reduce such insertion loss. In such configurations, a large parallel optical beam is transmitted through optical management elements and focused into the output fiber. Commercially-available fiber collimators fabricated from SMF28 fiber, such as may be used in C-band applications, have a comparatively low insertion loss of about 0.2 dB. However, some commercial applications require the use of optical fiber having core diameters of about 4 µm or less. These small-core optical fibers include, for example, HI980, HI1060 flexcore, and RC1550, which may be used in either an erbium-doped fiber amplifier (EDFA) pumping application or in a miniature sensor system. A shortcoming of this configuration is that fiber collimators fabricated using such small-core fibers may produce unacceptably high insertion losses of about 0.7 dB. The major reason for the relatively high insertion loss typical of small-core fiber collimators is primarily due to spherical aberration of the transmitted optical signal.

The small-core fiber must have a core with a relatively high index of refraction, i.e., a large numerical aperture (NA), if single-mode operation is to be maintained. However, when the NA of the small-core fiber is 0.2 or higher, and the small-core fiber is coupled to a C-lens, the diameter of light beam collimated by the C-lens may become unacceptably large and may produce non-paraxial rays which then cannot be efficiently coupled into a small core fiber at an output side. In other words, a large NA means that the light beam emitting from a small-core input fiber will exhibit a large divergence angle and, accordingly, will form non-paraxial rays in the circle of least confusion in the focal plane. Correspondingly high insertion loss may thus occur when the minimum circle diameter is larger than the small core fiber mode field diameter (MFD). The smaller the fiber core, the greater are the insertion losses that may result.

In the present state of the art, there continues to be interest in further miniaturization of optical fiber devices. The physical reduction of optical device elements requires interaction with a correspondingly smaller optical beam diameter. However, conventional manufacturing methods are not able to routinely produce either the requisite curvature radii for a C-lens collimator or the index profile for a GRIN lens collimator for such small optical beams. For example, while a miniature optical device may require a beam diameter of only about 80 to 150 µm, the minimum C-lens beam diameter attainable by conventional manufacturing methods may be about 230 µm for an SMF28 fiber application.

Certain methods practiced in the prior art are directed to the fabrication of fiber-like GRIN lenses. For example, U.S. Pat. No. 6,542,665 "GRIN fiber lenses" issued to Reed et al. discloses a GRIN fiber lens whose core refractive index radial profile has a radial second derivative specified to be a function of the refractive index on the axis of the fiber lens. U.S. Pat. No. 6,847,770 "Lens function including optical fiber and method of producing the same" issued to Kittaka et al. discloses a lens function comprising a gradient index optical fiber joined to an end surface of a step index optical fiber.

However, such methods have not found widespread application because of the complexity of the required manufacturing processes, such as ion exchange, and the associated costs. Additionally, while the use of a gradient index fiber lens seems like a viable solution, the resulting working distance is only about 1 to 2 mm. This relatively small working distance limits the usefulness of GRIN fiber lenses to isolator applications such as described in, for example, U.S. Pat. No. 6,643,428, "Optical fiber collimator and method for fabricating the same," issued to Chang, which discloses an optical fiber collimator comprising a single-mode fiber spliced to a graded-index multi-mode fiber of specified length.

Moreover, a fiber device may typically be required to operate over a temperature range of from −5 to 70° C. The resulting thermal effects on the metal and epoxy components found in the device may result in the collimator beam shifting slightly, and may produce even greater insertion loss. Hence, temperature dependence loss (TDL) can become a significant factor in small-core fiber devices. In addition, the power demand for certain optical devices continues to increase for newer components. For example, the typical power handling requirement has increased from about 500 mW to 2 W, or more. It has been shown that most fiber collimators, especially small-core fiber collimators, tend to fail under this power level.

In one conventional approach to solve the problems discussed above, a thermal diffusion process was used to heat the input fiber so as to expand the fiber core. U.S. Pat. No. 5,757, 993 "Method and optical system for passing light between an optical fiber and GRN lens" issued to Abe discloses a core expanded fiber produced by locally diffusing dopant contained in the core member using a thermally expanded core technique. However, this core-expansion method can be very time consuming and costly. For example, the method may require a heat treatment process of about 20 minutes and a temperature of approximately 1700° C. in order to expand a fiber core from 4 µm to 10 µm. To expand the fiber core to 30 µm, for example, may require a heating process operating from fifty to sixty minutes for completion. Moreover, since the heat source, typically a flame or micro quartz oven, may not provide a stable temperature, the repeatability of the core expansion process may be unacceptably low. Hence, a conventional fiber core-expansion method may not be adaptable to mass production.

What is needed is a device and method for quickly and efficiently expanding output from a small core optical fiber, that lends itself to mass production, provides a high yield, and has a low fabrication cost. It is thus an object of the present invention to provide such a method of low-loss coupling to a small core optical fiber via a C-lens which is also applicable to miniature optical devices. It is also an object of the present invention to provide such low-loss coupling devices having thermal stability and increased power handling capacity.

SUMMARY OF THE INVENTION

In one aspect of the present invention, an optical fiber collimator suitable for coupling optical radiation from an optical fiber to an output optical device comprises: a graded-index multi-mode fiber segment for expanding the mode of the optical radiation transmitted from the optical fiber; and a collimating lens for collimating the mode expanded optical radiation received from the graded-index multi-mode fiber segment, the collimated mode-expanded optical radiation for coupling into the output optical device.

In another aspect of the present invention, a fiber tip suitable for providing to a collimating lens optical radiation emitted from an optical fiber comprises: a graded-index multi-mode fiber segment disposed between the optical fiber and the collimating lens and a mode field component disposed to modulate the mode field in the optical radiation.

In yet another aspect of the present invention, a method for fabricating an optical collimator for an optical fiber comprises the steps of: splicing the optical fiber to at least one optical fiber segment and coupling optical radiation from the optical fiber segment to a collimating lens.

DETAILED DESCRIPTION OF THE INVENTION

The above objectives can be realized by an optical fiber collimator comprising a lens such as a regular lens, an aspheric lens, a C-lens or a GRIN lens, and a graded-index multi-mode fiber segment of specified length. The multi-mode fiber segment may be spliced to the output end of a single-mode small-core fiber by fusion splicing or, for low-power applications, by adhesive splicing. The multi-mode fiber segment length may be specified so as to provide for expansion of the mode field diameter (MFD) of the small core fiber to a desired design value. The disclosed mode field expanded fiber collimator can serve to reduce insertion loss induced by lens aberration, may increase the thermal stability of optical devices, and may be adaptable to miniature optical systems while providing for high power-handling capacity The disclosed methods may be used to obtain a mode field expanded fiber collimator having the desired MFD for an optical fiber. A first method, for example, may include a procedure of designing and selecting the core diameter and index profile of a graded index fiber. A second method, for example, may include adjusting a graded index multi-mode fiber length to obtain a desired MFD. A third method, for example, may include using a coreless pure silica fiber to adapt beam size by selectively determining coreless silica fiber length and graded-index fiber length to obtain various values of MFD.

Figure 3:
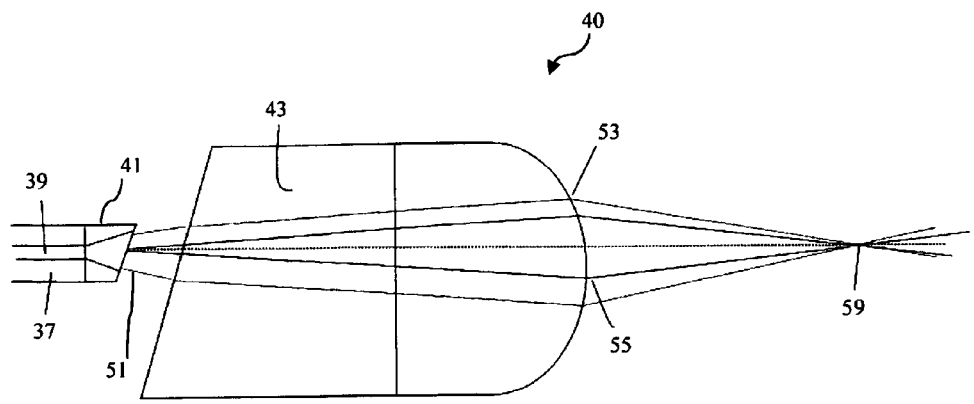
FIG. 3 is a diagrammatical illustration of an exemplary embodiment of a mode field expanded fiber collimator comprising a graded-index multi-mode fiber segment and a collimating lens, in accordance with the present invention.

FIG. 3 shows an exemplary embodiment of a mode field expanded fiber collimator 40 comprising a graded index multi-mode fiber segment 41 disposed between a conventional optical fiber 37 and a collimating lens 71, in accordance with the present invention. It can be appreciated by one skilled in the relevant art that the collimating lens 71 may comprise a graded-index lens (GRIN-lens), a C-lens, and aspheric lens, or other lens, in any of the exemplary embodiments disclosed herein. The optical fiber 37 includes a single-mode core 39 and may, for example, transmit optical radiation signals to the mode field expanded fiber collimator 40 from an optical switching network (not shown). In an exemplary embodiment, the mode field of the optical fiber 37 may have a diameter of about 4 μm or less. The optical fiber 37 may be attached to the graded-index multi-mode fiber segment 41 at a splice 49 produced by a splicing method known in the relevant art, such as fusion splicing or adhesive splicing. The graded-index multi-mode fiber segment 41 serves to widen or expand the mode in the optical radiation received from the optical fiber 37.

Figure 1:
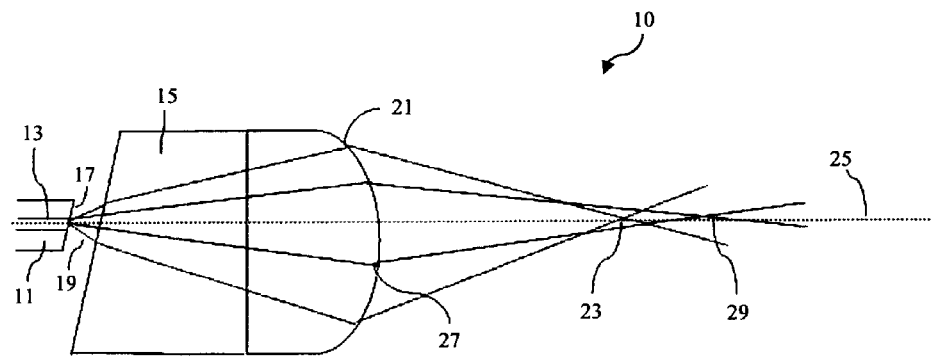
FIG. 1 is a diagrammatical illustration of an optical collimator comprising an optical fiber with a single mode core coupled to a C-lens, in accordance with the prior art.
Figure 2:
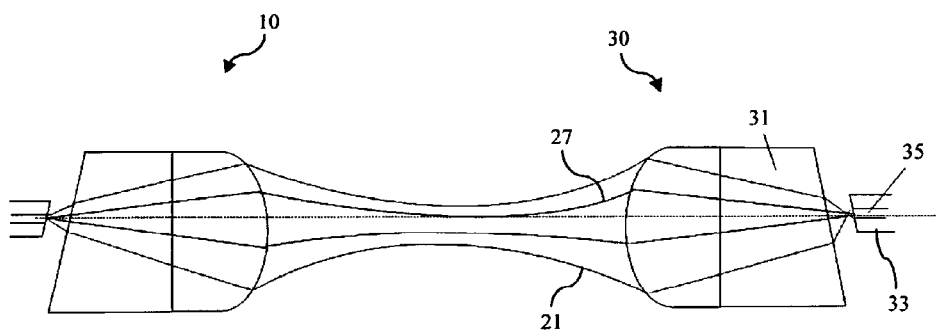
FIG. 2 is a diagrammatical illustration of the optical collimator of FIG. 1 in optical communication with a second optical collimator, in accordance with the prior art.

This configuration advantageously functions to produce a relatively large MFD in the graded-index multi-mode fiber segment 41 such that an optical beam 51 emerging from the graded-index multi-mode fiber segment 41 has a correspondingly small divergence, in comparison to the light beam 19 transmitted from the optical fiber 11 in FIG. 1, for example. Signals in the optical beam 51 may thus be more efficiently coupled to the collimating lens 71, as shown. With a proper choice of parameters for the graded-index multi-mode fiber segment 41, both a margin ray 53 and a paraxial ray 55 can have essentially the same focus point 59 at an output side of the collimating lens 71. This results in a relatively low insertion loss at an output optical device (not shown), such as an output optical fiber, an active device, or a connector, using the mode field expanded fiber collimator 40, in accordance with the present invention.

Figure 4:
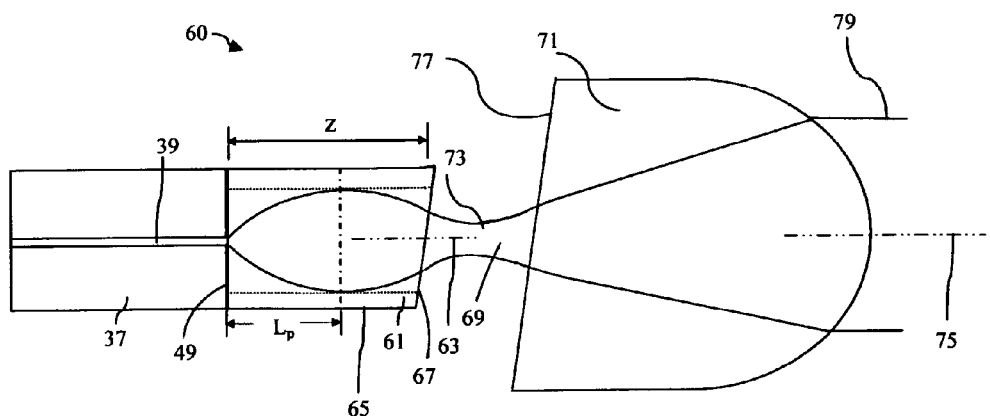
FIG. 4 is a diagrammatical illustration of another exemplary embodiment of a mode field expanded fiber collimator showing mode widening or expansion as a function of graded-index multi-mode fiber segment length, in accordance with the present invention.

As shown in FIG. 4, another exemplary embodiment of a mode field expanded fiber collimator 60 comprises a graded-index multi-mode fiber segment 61 of predetermined length and the collimating lens 71. Optical radiation propagating in the single-mode optical fiber 37 is transmitted into the graded-index multi-mode fiber segment 61. In an exemplary embodiment, the graded index multi-mode fiber segment 61 has the optical property such that the refractive index has a continuously variable value as a function of the radial distance from an optical axis 63 to an outer surface 65 of the graded index fiber segment 61. Thus, in the graded-index fiber segment 61, the optical rays travel in a waveform having a ray trace pitch denoted by 'P.' Note that in the diagram, the waveform has a maximum MFD at a position denoted by '$L_p$' that is essentially one-quarter ray trace pitch $$\left(\frac{P}{4}\right)$$

distance from the splice 49. In an exemplary embodiment, the segment length 'z' of the graded index fiber segment 61 is fabricated to be no greater than one half of the ray trace pitch distance, that is, satisfying the criterion $$0 < z \le \frac{P}{2}.$$

At an angled end face 67, the mode field expanded fiber collimator 60 produces an output beam 69 having a beam waist 73 and relative large MFD. The output beam 69 is incident on an angled entrance face 77 along an optical axial 75 of the collimating lens 71. In an exemplary embodiment, the length 'z' of the graded-index multi-mode fiber segment 61 is fabricated or specified to be approximately one-quarter ray trace pitch distance. The output beam 69 thus has a maximum MFD, and the beam waist 73 is positioned at or near the back focal point of the collimating lens 71 to output a substantially collimated beam 79. As known in the relevant art, the graded-index multi-mode fiber segment MFD can be controlled by specifying the diameter of the small-core fiber 37, the core size of the graded-index multi-mode fiber segment 61, a central index $n_o$, and the NA of the graded-index multi-mode fiber segment 61. See, for example, the discussion of fiber lenses found in the referenced technical paper "*Analysis and Evaluation of Graded-Index Fiber-Lenses*" by William L. Emkey et al.

Figure 5:
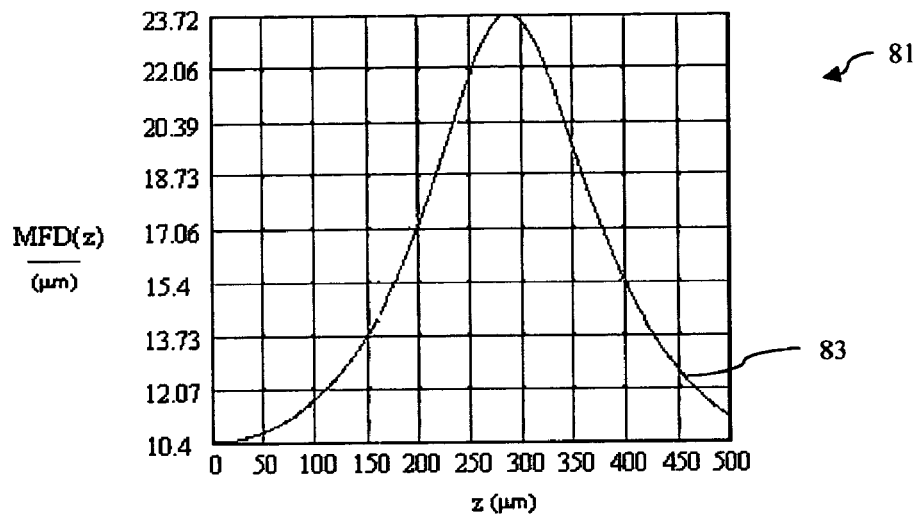
FIG. 5 is a graph showing mode field diameter of the radiation emitted by the graded-index multi-mode fiber segment of FIG. 3.

FIG. 5 is a graph 81 showing mode field diameter (MFD) as a function of length (z) of a graded index multi-mode fiber segment for a mode field expanded fiber collimator in accordance with the present invention. Data for curve 83 was obtained using a splice of SMF28 optical fiber to a 50/125-μm graded-index optical fiber segment having an NA of 0.20. As indicated by the curve 83, the maximum output MFD was about 23 μm at a fiber segment length (z) of approximately 286 μm.

Figure 6:
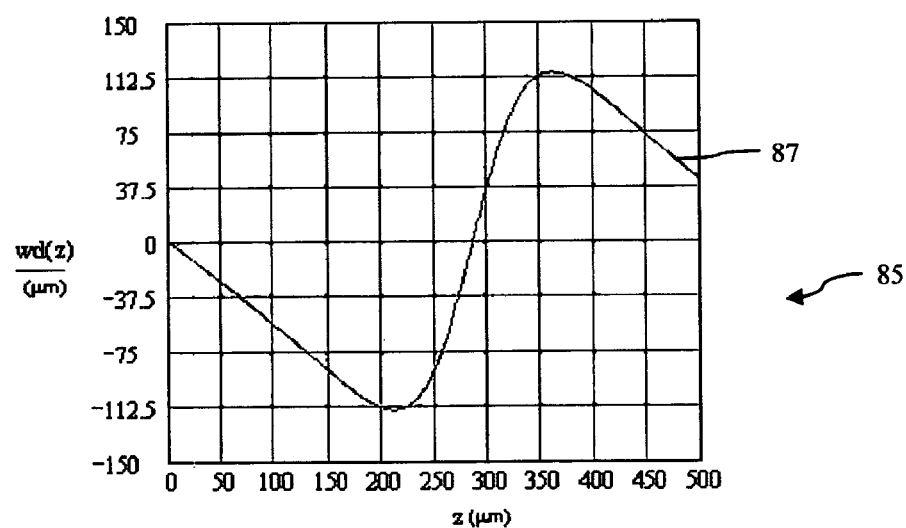
FIG. 6 is a graph showing working distance for the mode field expanded fiber collimator of FIG. 3.

FIG. 6 is a related graph 85 having a curve 87 showing the working distance 'wd' between a beam waist and a graded index multi-mode fiber segment end surface as a function of the fiber segment length (z) for the fiber segment of graph 81. The working distance was about zero for a fiber segment length of about 286 μm. The distance between the back focal point of the corresponding collimating lens and the output face of the graded index multi-mode fiber segment was selected so that the beam waist was positioned on an end surface of the collimating lens. Measurements determined that insertion loss for a collimator pair was reduced from about 0.2 dB to about 0.06 dB. Each collimator in the pair used a mode-expanded fiber pigtail having a 50/125-μm graded-index optical fiber segment spliced to the SMF28 single-mode optical fiber.

As can be appreciated by one skilled in the relevant art, cross talk may result in a transmitted optical beam when the size of an optical device disposed in the optical path is reduced. A beam size of about 80 to 150 μm is preferable in a miniature device design to reduce the presence of such cross talk. For a focused Gaussian beam, the beam size beyond a lens at its focal plane can be found from the relation $$d = \frac{4f\lambda}{\pi \times MFD}$$

where 'd' is the diameter of the beam waist and 'f' is the focal length of the collimating lens. It can be seen that a larger MFD will have a smaller beam size. For a standard C-lens having a cylindrical diameter of 1.8 mm and a curvature radius of about 0.9 mm, for example, the minimum focus length is about 1.2 mm for SF11 glass transmitting optical wavelengths at approximately 1.55 μm. The corresponding beam waist diameter will be about 230 μm with an MFD of about 10.4 μm using an SMF28 fiber core. The beam waist diameter will be approximately 80 μm when the MFD is 30 μm.

The insertion loss for a fiber optical device may vary as a function of operating temperature because material thermal expansion mismatch may cause relative movement in the components of an aligned optical collimator. The resulting temperature dependent insertion loss (TDL) variation may be great enough to affect the optical performance of the optical collimator. A core-expanded or mode field expanded fiber collimator can significantly reduce the effects of TDL. The emitting light divergence angle can be reduced via an input collimator, and the light-acceptance area can be increased via an output collimator. This results in a collimator pair that has larger transverse and longitude displacement tolerances, in comparison to fiber optical device configurations without core expansion. Typically, the TDL can be reduced from about 0.3 dB to about 0.1 dB for a mode or core expansion from 10 μm to 23 μm.

Figure 7:
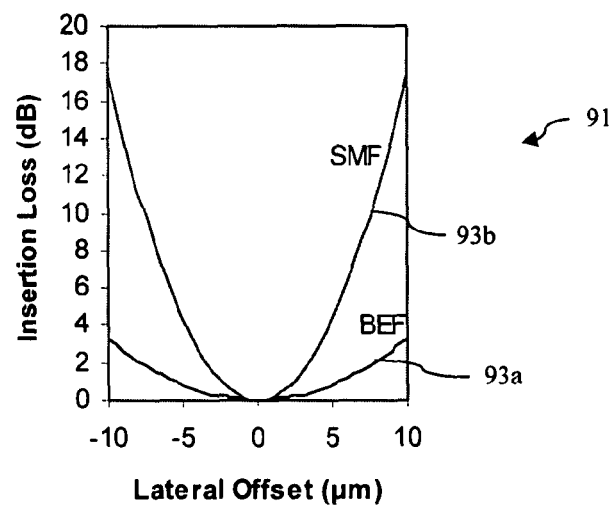
FIG. 7 is a graph providing a comparison of insertion loss as a function of lateral offset for the mode field expanded fiber collimator of the present invention and for a conventional fiber collimator.
Figure 8:
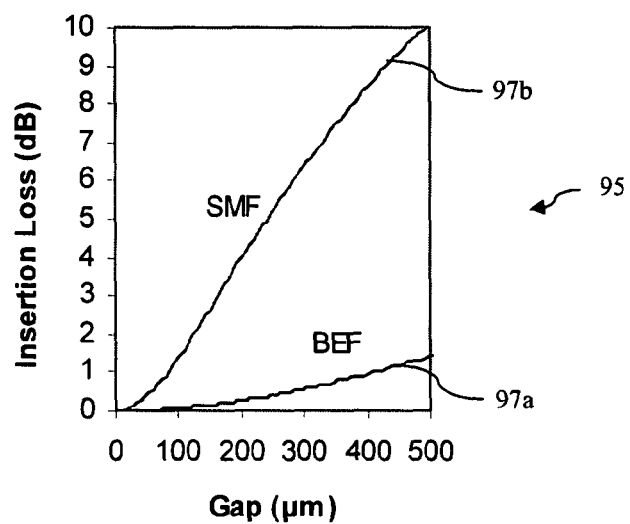
FIG. 8 is a graph providing a comparison of insertion loss as a function of gap size for the mode field expanded fiber collimator of the present invention and for a conventional fiber collimator.

FIG. 7 is a graph 91 showing collimator insertion loss as a function of lateral or transverse offset of the collimating lens with respect to an output optical fiber or other optical device. Insertion loss for a mode field expanded fiber collimator spliced with the 50/125-μm graded-index optical fiber, shown by curve 93a, is significantly less than the insertion loss for a single-mode fiber without a mode field expander, shown by curve 93b. FIG. 8 is a graph 95 showing collimator insertion loss as a function of gap or longitudinal offset of the collimating lens with respect to an output optical fiber. It can be seen that for same amount of relative displacement, the mode field expanded fiber collimator, shown by curve 97a, has lower insertion loss variation in comparison to a conventional coupling configuration, shown by curve 97b.

It is known in the relevant art to limit the power density passing through a fiber collimator as a means of preventing the onset of pigtail surface damage. Since there is an abrupt change in index of refraction at the output surface of the fiber pigtail, the transmitted optical radiation may produce a high temperature at the small core area of the optical fiber causing damage to the antireflection coating upon absorption at defects. Such damage can be mitigated by keeping the fiber pigtail surface clean and by applying a plasma pre-treatment for anti-reflection coating to increase the high power-handling capacity, but such configuration may have limited applicability. A more preferable approach is to reduce the radiation power density on the fiber pigtail output surface by increasing the effective light passage area of the fiber core.

Figure 9:
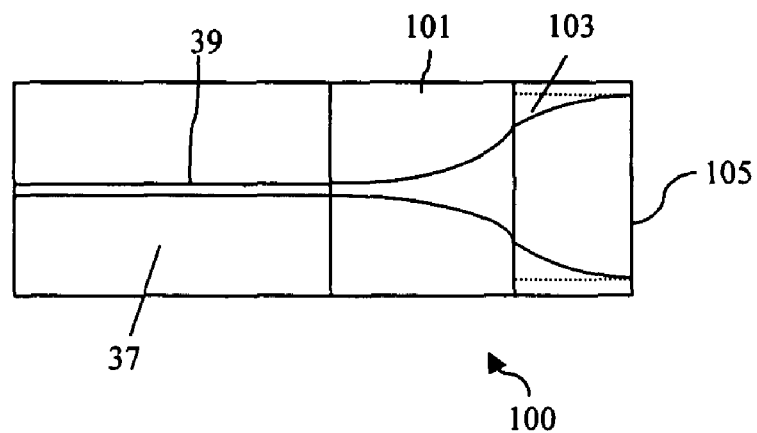
FIG. 9 is an alternate exemplary embodiment of the mode field expanded fiber collimator in accordance with the present invention, having a coreless silica fiber segment to reduce power density at an output surface.

There is shown in FIG. 9 an exemplary embodiment of a fiber tip 100, in accordance with the present invention, for providing to the collimating lens 71 (shown in FIG. 4) optical radiation emitted from the optical fiber 37. The fiber tip 100 comprises a coreless silica fiber segment 101 disposed in an optical path between the single mode optical fiber 37 and a graded index multi-mode fiber segment 103. The coreless silica fiber segment 101 is a mode field component disposed to modulate the mode field of the optical radiation transmitting through the coreless silica fiber segment 101. In the configuration shown, the coreless silica fiber segment 101 provides for initial mode expansion in the optical radiation emitted by the optical fiber 37 and received by the graded index multi-mode fiber segment 103. The coreless silica fiber segment 101 can be fabricated to a predetermined length that will produce a desired value of MFD. The MFD of the multi-mode device 100 is thus correspondingly larger than the MFD of FIG. 4, for example. Accordingly, the configuration of FIG. 9 can be used for applications requiring a lower power density at an output surface 105 of the fiber tip 100, and received at the collimating lens 71.

By appropriately selecting the length of the coreless silica fiber segment 101 to expand the optical beam emitted by the single-mode core 39 of the optical fiber 37, the area of optical propagation in a mode expanded fiber collimator can be increased by a factor of about nine to twelve over that of mode field expanded fiber collimator without a coreless silica fiber. The power density is thus decreased at the output surface 105, and the power handling capacity of a fiber collimator using the fiber tip 100 is correspondingly increased by about an order of magnitude, for example, from about 500 mW to about 5 W.

Figure 10:
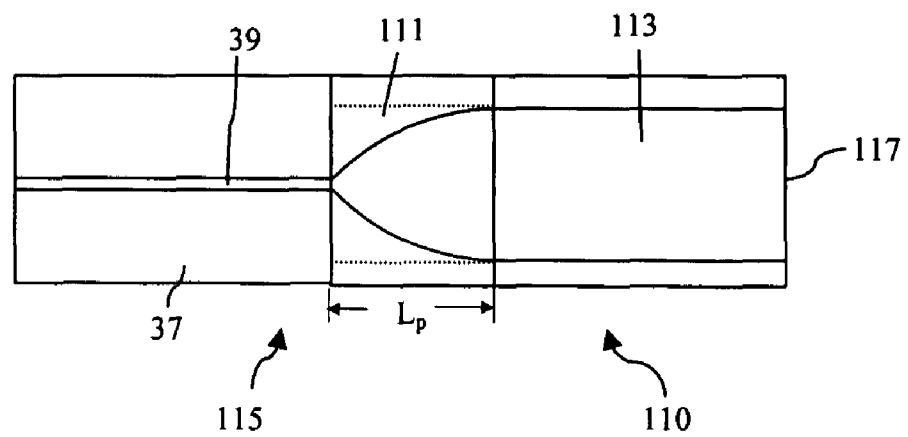
FIG. 10 is an alternate exemplary embodiment of the mode field expanded fiber collimator in accordance with the present invention, having a step-index graded index multi-mode fiber segment to provide for a less critical fabrication process.

Another exemplary embodiment of a fiber tip 110, in accordance with the present invention, is shown in FIG. 10. The fiber tip 110 comprises a graded index fiber segment 111 and a step-index graded index multi-mode fiber segment 113. A fiber pigtail 115 may include the graded index multi-mode fiber segment 111 of a specified segment length spliced to the single mode optical fiber 37 to provide for expansion of the MFD in the optical radiation emitted by the optical fiber 37. The step-index graded index fiber segment 113 is a mode field component disposed to modulate the mode field in the optical radiation emitted by the graded index multi-mode fiber segment 111. Accordingly, the step-index graded index fiber segment 113 has a fundamental mode field that is matched with the fiber pigtail 115. As can be appreciated by one skilled in the art, when the step-index graded index fiber segment 113 is disposed in the optical path of the fiber pigtail 115 as shown, only a single-mode optical radiation propagates in the step-index graded index fiber segment 113.

The advantage of this configuration is that the optical radiation output of the fiber pigtail 115 has an essentially constant MFD along the step-index graded index fiber segment 113 and therefore does not require that a precise predetermined length be fabricated for the step-index graded index fiber segment 113 to provide for optimal operation. As appreciated in the relevant art, the time of polishing and the speed of polishing are controllable in forming an output end 117 of the step-index graded index fiber segment 113. Thus, when the fiber tip 110 is fabricated, there may be provided a greater dimensional tolerance in the polishing of the output end 117 to produce a specified length. For example, the specified length can be monitored by using a microscope and a digital reader. In an optional fabrication step, an anti-reflection layer can be coated onto the output end 117.

While the invention has been described with reference to particular embodiments, it will be understood that the present invention is by no means limited to the particular constructions and methods herein disclosed and/or shown in the drawings, but also comprises any modifications or equivalents within the scope of the claims.

What is claimed is:

1. An optical fiber collimator suitable for coupling optical radiation from an optical fiber to an output optical device, said optical fiber collimator comprising:
  a graded-index multi-mode fiber segment for expanding the mode of the optical radiation transmitted from the optical fiber;
  a collimating lens for collimating said mode expanded optical radiation received from said graded-index multi-mode fiber segment, said collimating lens providing said collimated mode expanded optical radiation for coupling into the output optical device; and
  a step index fiber segment disposed between said graded index multi-mode fiber segment and said collimating lens; said step index fiber segment having a fundamental mode field that is matched with said graded-index multi-mode fiber segment for maintaining an essentially constant mode field diameter for mode expanded optical radiation transmitted in said step index fiber segment; said collimating lens being disposed away from and detached from said step index fiber segment.

2. The optical fiber collimator according to claim 1 wherein said graded index multi-mode fiber segment is spliced to the optical fiber.

3. The optical fiber collimator according to claim 1 wherein said collimating lens comprises one of a C-lens, a graded-index lens, and an aspheric lens.

4. The optical fiber collimator according to claim 1 further comprising a coreless pure silica fiber segment disposed between the optical fiber and said graded-index multi-mode fiber segment, said coreless pure silica fiber segment for providing mode expansion to optical radiation emitted by the optical fiber.

5. The optical fiber collimator according to claim 1 wherein said graded-index multi-mode fiber segment comprises a segment length of no greater than one-half ray trace pitch distance, where the wavefront of the optical radiation from the optical fiber has a maximum mode field diameter at a one-quarter ray trace pitch distance from the optical fiber.

* * * * *